March 4, 1930. H. P. NIELSEN 1,749,502
WHEEL STRUCTURE
Filed March 23, 1927 3 Sheets-Sheet 2
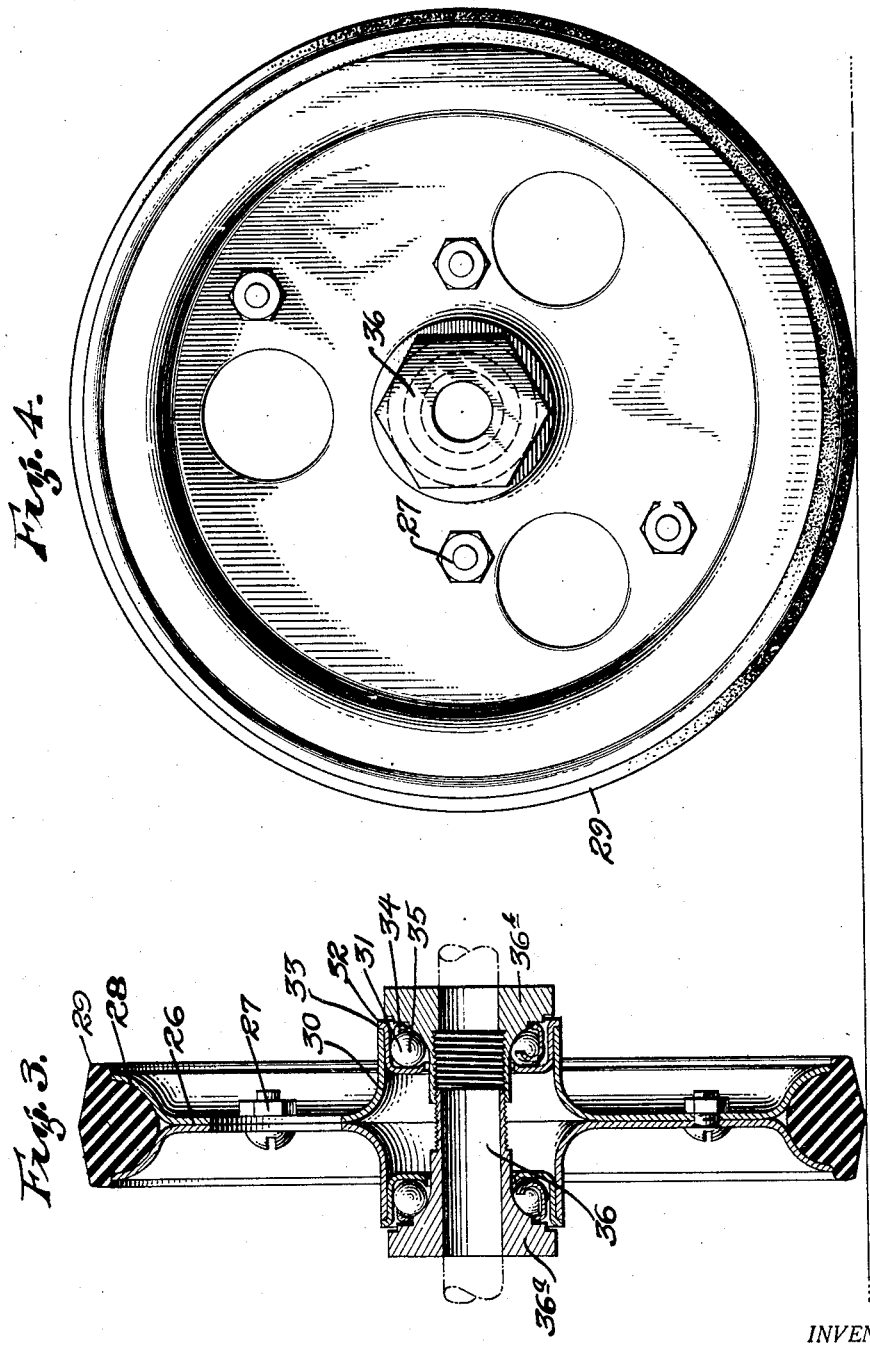
INVENTOR.
HANS P. NIELSEN
BY
ATTORNEYS.

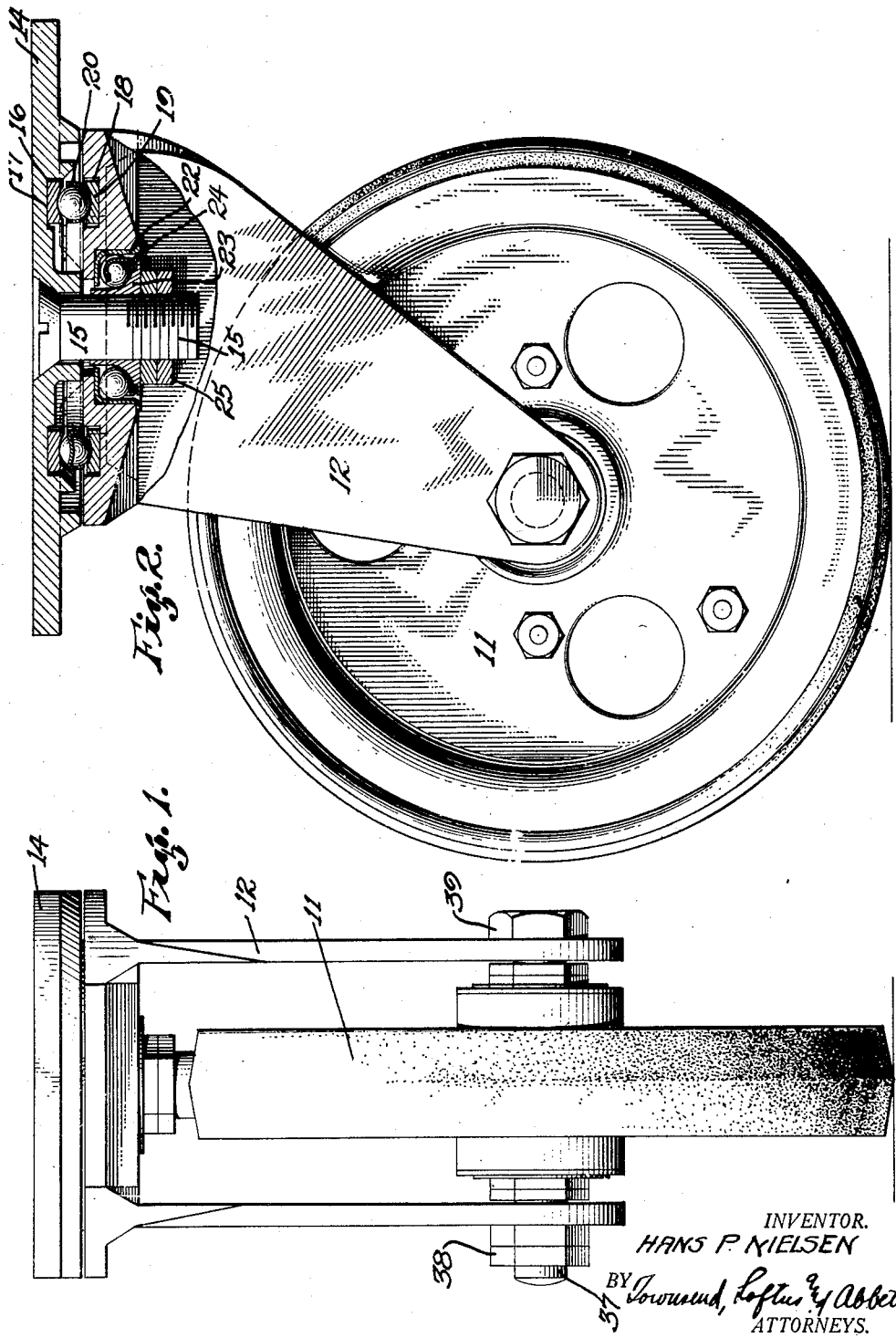
March 4, 1930. H. P. NIELSEN 1,749,502
WHEEL STRUCTURE
Filed March 23, 1927 3 Sheets-Sheet 1
INVENTOR.
HANS P. NIELSEN
BY Townsend, Loftus y Abbett
ATTORNEYS.

March 4, 1930. H. P. NIELSEN 1,749,502
WHEEL STRUCTURE
Filed March 23, 1927 3 Sheets-Sheet 3
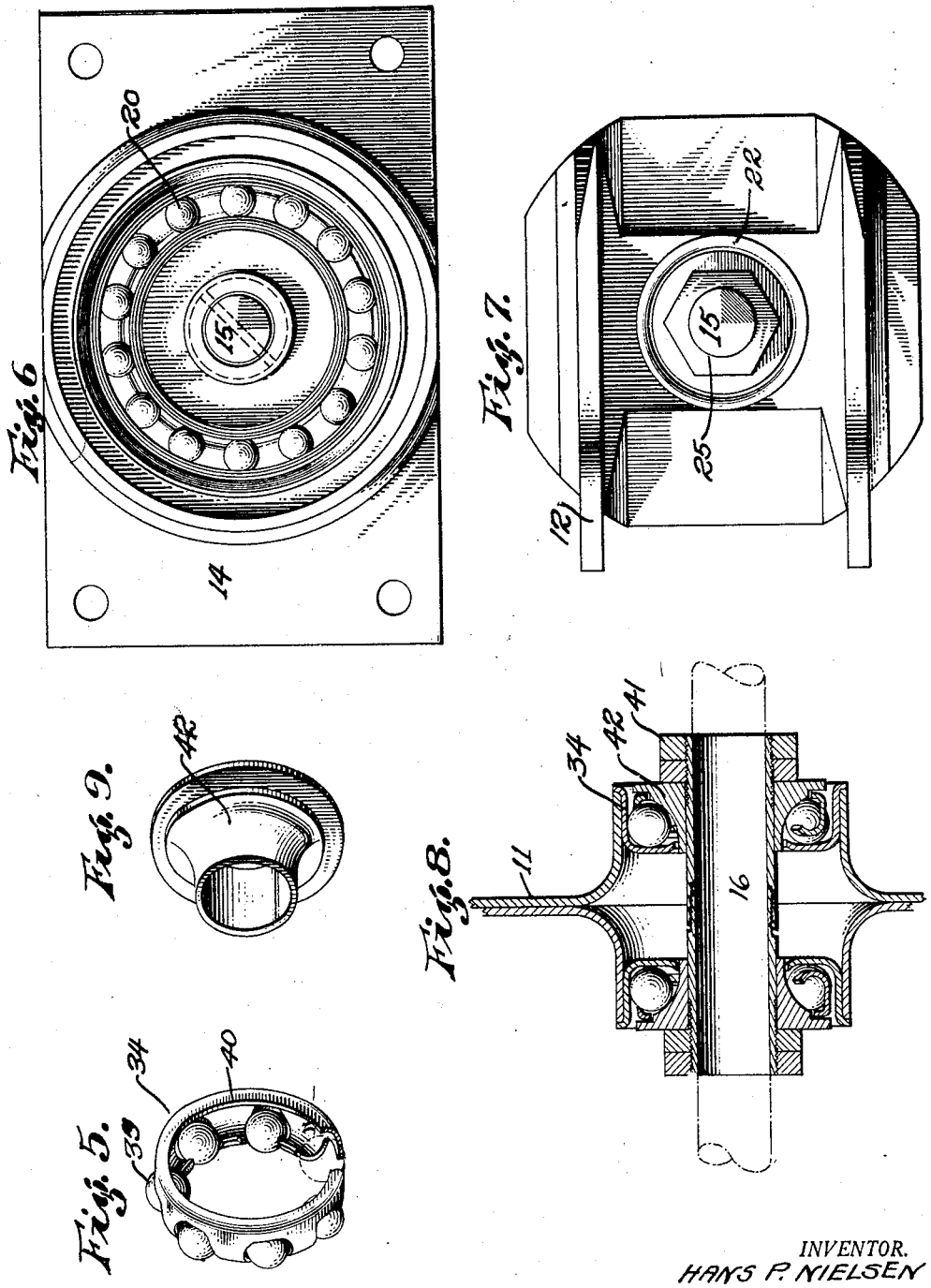
INVENTOR.
HANS P. NIELSEN
BY
ATTORNEYS.

Patented Mar. 4, 1930

1,749,502

UNITED STATES PATENT OFFICE

HANS P. NIELSEN, OF ALAMEDA, CALIFORNIA, ASSIGNOR TO EAMES COMPANY, OF SAN FRANCISCO, CALIFORNIA, A CORPORATION OF CALIFORNIA

WHEEL STRUCTURE

Application filed March 23, 1927. Serial No. 177,590.

This invention relates to wheels and particularly pertains to swivel caster wheels.

It is the principal object of the present invention to generally improve and simplify the construction and operation of swivel caster wheels whereby to provide a wheel of this type which will operate efficiently for a maximum length of time without adjustments, repairs or replacements, and which is comparatively inexpensive to manufacture.

One form which the invention may assume is exemplified in the following description and illustrated by way of example in the accompanying drawings, in which:

Fig. 1 is an end elevation of a wheel structure embodying the preferred form of my invention.

Fig. 2 is a side elevation of the same partly in section disclosing the construction of the swivel mounting.

Fig. 3 is a vertical central section through the wheel disclosing the construction of its bearing.

Fig. 4 is a side elevation of the wheel.

Fig. 5 is a perspective view of the ball bearing retainer.

Fig. 6 is a view of the thrust bearing portion of the swivel mounting.

Fig. 7 is a bottom view of the wheel carrying fork.

Fig. 8 is a sectional view through a wheel bearing hub showing a slightly modified form of construction.

Fig. 9 is a perspective view of the cone used in the modified form of the wheel bearing structure disclosed in Fig. 8.

Referring more particularly to the accompanying drawings 10 indicates a wheel structure comprising a wheel 11, a fork 12 carrying the wheel and a plate 14 which is connected to the fork and used to connect the wheel structure to the bottom of a truck or other type of vehicle. The plate 14 is provided with a plurality of openings through which bolts or screws may be inserted to secure the plate on the under side of the vehicle upon which it is desired to mount the wheel structure.

Reference being had to Figs. 1 and 2, it is seen that at its center the plate 14 is provided with a central bore through which a pivot bolt 15 is inserted. The bore through the plate is countersunk at the top to accommodate the head of the pivot bolt 15. This pivot bolt 15 extends through the horizontal top portion of the fork 12 and acts to pivotally connect the fork to the plate 14 as will be described. The fork 12 pivots about the pivot bolt 15 so that the wheel 11 carried by the portion of the fork may freely revolve in any direction about the axis of the bolt 15.

To form a thrust bearing between the plate 14 and the horizontal portion of the fork 12, the under side of the plate 14 is formed with a groove 16 within which a ball race 17 is positioned. A similar groove 18 is formed in the top surface of the horizontal portion of the fork 12 and within which is disposed a ball race 19. The ball retainer 20 of the thrust bearing is inserted between the ball races 17 and 19 to take the thrust of the load imposed upon the wheel structure. It will be noticed that the grooves 16 and 18 are slightly larger than the races 17 and 19 so that the thrust bearing will be self centering and be disposed perfectly concentric with relation to the pivot bolt 15.

To provide ease in the swivelling of the fork 12 about the pivot bolt 15 an anti-friction bearing 21 is provided. The underside of the horizontal portion of the fork 12 is counterbored concentric with the pivot bolt 15 and a cup-shaped cone 22 is pressed therein in an inverted position. An inner cone 23 is disposed on the pivot bolt 15. Between the inner and outer cones 22 and 23 a ball retainer 24 is disposed and the bearing elements carried thereby bear on the inner and outer cones. The bearing is held assembled by nuts 25 threaded on the pivot bolt 15 which bear against the inner cone and maintain the fork 12 and the plate 14 in assembled positions.

It is seen that a ball bearing structure is provided to take the thrust or load imposed on the wheel structure and that an anti-friction bearing is provided upon which the fork revolves so that it will swivel easily and smoothly.

The fork 12 receives the wheel 11 as disclosed in Fig. 1. The structure of this wheel is most clearly shown in Fig. 3 where it is seen that the wheel comprises a pair of opposed disks 26 which are bolted together by means of bolts 27. These disks 26 are complementary and oppositely disposed and their outer peripheral edges are arcuate in cross section so as to form a rim 28 receiving a rubber tire 29 of desired construction. At their centers the disks 26 are formed with axially projecting hubs 30 which receive anti-friction bearing structures 31. These bearing structures comprise an outer cup-shaped cone 32. At their outer ends each cup-shaped cone 32 is formed with a circumscribing flange 33 of the same exterior diameter as the hub 30 within which it is pressed. The diameter of the body portion of the cup-shaped cones are substantially the same as the interior diameter of the hub so that it may be retained in the hub by a press fit.

From Fig. 3 it is seen that one of these cups 32 is pressed into each end of the hub of the wheel, and that a ball retainer 34 is arranged within the cups. To form inner cones a spindle 36 is provided which is formed in two parts 36ª and 36ᵇ. The outer end of each portion of the spindle is formed hexagonal and of dimensions substantially the same as the outer diameter of the hub. At their inner ends the opposite sections of the spindle 36 are threadedly connected. That is to say, the inner end of the section 36ª is formed with a male thread adapted to engage a female thread in the inner end of the section 36ᵇ so as to connect the two. Intermediate their ends the sections 36ª and 36ᵇ are turned to form opposed inner cones which co-operate with the outer cones 32 in forming the race for the bearing.

In assembling the wheel, the cups 32 are first pressed into place within the opposite ends of the hub. The ball retainers are then positioned and the sections 36ª and 36ᵇ of the spindle 36 are inserted in opposite ends and threadedly connected, bearing with proper pressure on the bearing balls 35. The wheel structure, as described, is then placed between the legs of the fork 12 and an axle 37 is inserted transversely through the legs of the fork and the spindle 36. This axle is held in place by nuts 38 arranged at one end and a head 39 at the other end. The distance between the exterior faces of the sections 36ª and 36ᵇ is substantially equal to the spacing between the inner faces of the legs of the fork 12.

It is desired here to call attention to the peculiar and improved construction of the ball retaining ring 34. It will be noticed in Fig. 5 that this retaining ring is circular in form having an inturned flange 40 at one end. The other end is formed with a plurality of equally spaced recesses to receive the balls 35. The portions of the ring intermediate the recesses is turned in after the balls are assembled in the recesses to retain the balls in place. By this peculiar construction, a maximum bearing of the balls against the cones of the bearing is obtained. It will be noticed in Fig. 3 that the balls bear on the outer cone at two points and have a large bearing on the inner cone.

In Figs. 8 and 9 I have shown a slightly modified form of spindle construction. In this modified form the spindle is in substance two sleeves which are threadedly connected at their inner ends, the outer ends of the sleeves being exteriorly threaded to receive nuts 41. Cones 42 are loosely mounted on the sleeves and are drawn up to their proper position relative to the balls of the bearings by means of the nuts 41.

In assembling this modified form of construction the cups 32 are pressed in place at the ends of the hubs and the ball retainers are positioned therein. An inner cone is assembled on each section of the spindle and these spindles are inserted through opposite ends of the cups and threadedly connected. The nuts 41 are then taken up to take up the bearing the proper amount. After this has been done the wheel is inserted between the legs of the fork 12 and the axle is inserted through the central bore of the spindle.

From the foregoing it is obvious that I have provided a generally improved caster wheel structure wherein all the rotating parts are fitted with anti-friction bearings of improved construction. The construction and mounting of the various portions of the wheel is such that the wheel will operate efficiently for a maximum length of time without adjustments, repairs or replacements. Likewise, it is seen that the wheel may be comparatively inexpensively manufactured and assembled.

While I have shown the preferred form of my invention, it is to be understood that various changes may be made in its construction by those skilled in the art without departing from the spirit of the invention, as defined in the appended claim.

Having thus described my invention, what I claim and desire to secure by Letters Patent is:

A wheel of the character described including a pair of complementary disks secured together, each disk having an outwardly drawn hub end cooperating to form a hub for the wheel, a cup-shaped outer cone of a diameter agreeing with the interior diameter of the hub, one of said cup-shaped outer cones being tightly pressed within each end of the hub, a circumscribing flange at the outer end of each cup-shaped outer cone, said flange being of a diameter agreeing with the exterior diameter of the hub against the end of which it is adapted to abut when the outer cones are pressed into place, a spindle adapted to extend transversely through the hub, said spindle formed in two parts arranged in longitudinal alignment, the inner end of the parts being of a diameter permitting them to be inserted into the hub through the outer cones, the inner ends of the parts of the spindle being formed with male and female threads whereby they may be threadedly connected, the outer end of each part of the spindle being enlarged and of a transverse dimension substantially the same as the diameter of the hub, an inner cone turned on each portion of the spindle to cooperate with the outer cones, and anti-friction bearing members interposed between the inner and outer cones, the adjustment of the bearings being made by adjusting the portions of the spindle toward and away from each other, said spindle having a central bore formed axially therethrough to receive an axle.

HANS P. NIELSEN.